Figure 1:
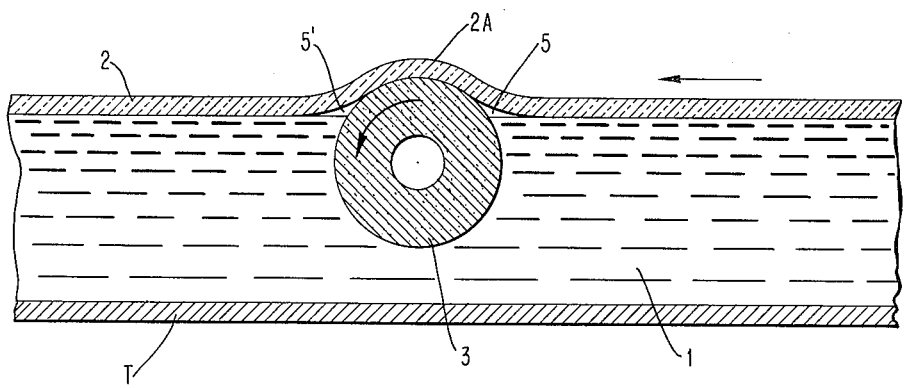

May 10, 1966  R. DE TOYTOT ETAL  3,250,604
METHOD AND APPARATUS FOR PROTECTION OF GLASS SHEET
IN CONTACT WITH METAL BATH
Filed March 8, 1962

INVENTORS
ROBERT de TOYTOT
BY  HANS BROLMANN

Bauer and Seymour
ATTORNEYS

United States Patent Office 3,250,604
Patented May 10, 1966

3,250,604
METHOD AND APPARATUS FOR PROTECTION OF GLASS SHEET IN CONTACT WITH METAL BATH
Robert de Toytot, Saint-Maur-des-Fosses, Seine, and Hans Brolmann, Paris, France, assignors to Compagnie de St. Gobain, Neuilly-sur-Seine, France
Filed Mar. 8, 1962, Ser. No. 178,325
Claims priority, application France, Mar. 13, 1961, 955,421, Patent 1,291,606; Mar. 5, 1962, Patent 889,953
9 Claims. (Cl. 65—32)

This invention relates to the manufacture of sheet glass by the process in which the newly formed sheet is brought into contact with a molten metal bath. In the usual application of this so-called float process the sheet of glass issues from between forming rollers and is floated on the surface of a bath of molten tin or tin alloy which decreases in temperature from the head to the discharge end, the temperature at discharge being below the deformation temperature of the glass.

The glass produced by the float process has high luster and level surface but it is sometimes marred by surface imperfections of somewhat geometrical aspect, usually appearing on the lower face which contacts the metal baths, and particularly when the glass is floated in the air of the furnace room.

It is an object of this invention to discover the cause of such imperfections and to ameliorate the condition by an efficient and inexpensive method. Another object is to carry out the float process in an oxidizing atmosphere without entailing such imperfections. Another object is to supply novel apparatus for the novel method.

The objects are accomplished, generally speaking, by a method of protecting the face of a sheet of glass which is in contact with a bath of molten metal which comprises suffusing the said face of the sheet with a non-oxidizing gas, at an intermediate stage of its progress across the bath and putting the sheet again in contact with the bath.

In the making of glass by the float process it has been the practice to prevent the oxidation of the bath by keeping it under a chemically inert atmosphere. Now, the oxide of tin is volatile above 700° C. but is not so below that temperature, the temperature of the bath is below that temperature near the discharge end, and we have observed that tin and its alloys tend to oxidize, when air is present, and to float in the bath.

The use of the inert atmosphere above the bath did not prevent the formation of such oxides, even beneath the glass sheet where one would have thought the floating glass would have prevented the oxidation. The shape of the imperfections in the glass surface in contact with the molten metal bath, being geometric and usually square or star-shaped, led us to believe that the source of the imperfections is found in crystalline oxides of tin located beneath the glass, which are probably formed in the cooler discharge end of the bath.

We overcome these imperfections by a method which is not wholly clear but which is successful. The sheet of glass is separated from the metal bath, briefly, during an intermediate part of its course, is suffused at least on its metal contacting, lower face by a gas which is either reducing or neutral, that is to say which is non-oxidizing, and is again engaged with the bath.

This method has an added advantage in that it makes it unnecessary to carry out the process in an inert atmosphere, and makes it possible to obtain satisfactory results of high quality in the air. We have discovered that by separating the glass from the metal, even for a very short time, and suffusing it during that time with a non-oxidizing gas, eliminates the defects characteristic of prior process even of those which have attempted to operate in the air of the furnace room.

The sheet may be separated from the surface of the metal bath anywhere between its place of deposit on the metal and the place where it, having been cooled, is no longer readily deformable.

The establishment of an inert or reducing atmosphere may be accomplished by injecting a gas such as nitrogen, argon, hydrogen, or an oxide of carbon into the space beneath the sheet of glass after it has been temporarily separated from the surface of the metal bath. Simple nozzles appropriately aimed into this space and supplied with the selected gas are used. This has the double effect of contacting the sheet of glass and of contacting the free surface of the bath beneath the glass. When the separation of the glass from the bath is made near the head end of the furnace the non-oxidizing atmosphere exerts its effect at the hottest part of the bath, preventing further oxidation and correcting such oxidation as may have occurred or is in progress. The protective effect of the method extends throughout the length of the bath even though it is applied to only a short length of the bath. After the brief treatment, which may be no longer than is required to lift the sheet out of the bath on the surface of a roller, it is deposited again on the surface and forwarded as was customary in the prior art.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

Figure 2:
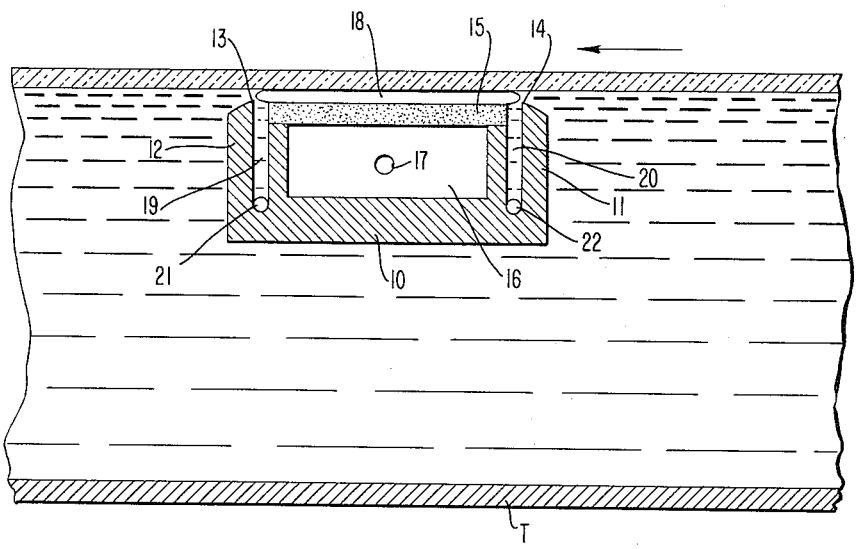

In the drawings, wherein like reference characters refer to like parts throughout the several views, FIG. 1 is a schematic view partly in section taken vertically through a metal bath on which a sheet of glass is moving in the direction of the arrows;

FIG. 2 is a similar view of a modified form of the apparatus.

In FIG. 1 a tank T contains a metal bath 1 of tin or tin alloy upon which a ribbon of glass 2 is moving toward the left, engaging, in its course, a graphite roller 3 which is submerged in the metal except for a small arc which is sufficient to lift the sheet free of the metal, leaving spaces 5 and 5' between the sheet, the bath, and the roller extending completely across the width of the sheet. The roller is preferably graphite or some other inert material with a smooth surface. The roller is freely mounted on bearings and need not be driven as the motion of the sheet itself is sufficient to move it. Nozzles (not shown) are introduced into the spaces 5 and 5' and inject appropriate gases, of the type described above, into those spaces establishing an inert or reducing atmosphere according to the requirements of the process.

As an example of the use of this type of apparatus glass was made according to a typical formula for window glass, was rolled to size between graphite rollers and deposited on a bath of molten tin, the temperature of which was controlled in accordance with practices which are not a part of this invention, progressing from hotter at the receiving end to cooler at the discharge end. At the discharge end the temperature of the molten metal was such that the glass was congealed to a temperature below that at which ordinary handling means could mar the surface. The roller of this invention was placed at a part of the bath where the temperature was between 680 and 800°. The gas employed in this particular test was nitrogen which had been preheated to the same temperature in order to avoid temperature effect. The glass was lifted about one centimeter above the surface of the bath. The sheet, which had been subject to imperfections of the type hereinabove described, was discharged free of such imperfections after installation of this invention.

Instead of nozzles it is possible to utilize a porous material; the roller is then hollow and made of porous graphite. The neutral or reducing gas is introduced in the central part of the roller and escaped through the orifices.

According to another form of the invention the separation of the glass ribbon from the molten metal bath with interposition of a neutral or reducing atmosphere is obtained without lifting the glass ribbon by a mechanical element. In said case one utilizes a chamber immersed into the molten metal bath, near its surface, the upper surface of the chamber being constituted by a porous refractory plate.

The gas introduced into the chamber escapes by the orifices of the porous plate producing above it a gaseous cushion onto which the glass ribbon passes without deformation.

To obviate the carrying away of gaseous bubbles by the glass ribbon in its relative displacement with respect to the chamber, the upper part of said chamber is provided at the front and at the back of the porous plate with a transversal groove in communication with a suction conduct for the gas accumulated between the porous plate and the glass ribbon to prevent the displacement of the gas with the ribbon.

This modification illustrated on FIG. 2 has the advantage that the sheet of glass need not be warped out of its horizontal path to pass over a roller but passes over a submerged gas chamber which extends across the bath and is provided with an impervious bottom 10 and sides 11, 12, the upper portions of which have smoothly machined surfaces 13, 14. Just under the glass ribbon a porous graphite plate 15 seals the gas chamber 16 against the entrance of liquid and permits the escape of gases which are injected into the chamber through the port 17. These gases pass upward through the pores of plate 15 into a space 18 which lies between the lower surface of the glass and the upper surface of the plate. The non-oxidizing gas fills this space 18 and performs the function which has been described hereinabove.

The gas is then withdrawn by vertical conduits 19, 20 which have at their bottoms channels 21, 22 through which the gas eventually accompanied by some liquid drops from the bath can be withdrawn by applying vacuum to the members 21, 22. All the gases which engage the bottom of the glass above the plate 15 are retained so that no bubbles form beneath the glass as it again engages the bath after having passed over the plate.

The advantages of the invention are substantial and include the elimination of the necessity of conducting the operation in non-oxidizing atmosphere, the substantial elimination of the imperfections which were previously characteristic of the glass made by this process particularly the elimination of geometric designs, and the novel apparatus which carries out the novel process.

As many apparently widely different embodiments of the present invention may be made without departing from the spirit and scope thereof, it is to be understood that the invention is not limited to the specific embodiments.

What is claimed is:

1. A method of protecting the face of a glass sheet which is in contact with a bath of molten metal, said sheet being adapted to be moved across said bath, said method comprising interrupting the contact between said face and said bath during the progress of said sheet across said bath for a predetermined space interval, and suffusing said face at said interval with a non-oxidizing gas.

2. A method of protecting from defacement the face of a vitreous sheet in contact with a molten metal bath containing metallic oxides, said method comprising removing a part of said face from contact with the bath, suffusing the part with a non-oxidizing atmosphere, and returning the part into contact with the bath.

3. The method according to claim 1 which comprises suffusing the face of the sheet with the non-oxidizing gas where the temperature of the bath is between about 680 and about 800° C.

4. Apparatus for the manufacture of sheet glass comprising a tank adapted to contain a bath of molten metal such as tin, means to move a sheet of glass across the surface of the bath, and means to suffuse at least the face of said sheet in contact with said bath with a non-oxidizing atmosphere at an intermediate stage of its progress across the bath.

5. Apparatus according to claim 4 in which the means to suffuse comprises a porous graphite body in proximity to said face of the sheet and supply means of said gas adapted to pass said gas through said porous body to provide said atmosphere for said face.

6. Apparatus according to claim 4 in which the means to suffuse comprises a porous plate disposed beneath said face and means to pass the non-oxidizing gas through the porous plate into contact with said face.

7. Apparatus according to claim 4 wherein said means to suffuse comprises a member disposed in said bath and adapted to elevate said sheet therefrom to interrupt said contact for a predetermined space interval and supply means of said gas adapted to provide said atmosphere at least at said interval to said face.

8. Apparatus according to claim 4 wherein said means to suffuse further comprises means to interrupt the contact between said face and said bath during the progress of said sheet across said bath for a predetermined space interval, said face being suffused with said gas at said interval.

9. Apparatus according to claim 8 wherein the sheet is adapted to be moved across said bath in a predetermined location, said means for interrupting comprising a hollow porous roller partially immersed in the bath and having its longitudinal axis substantially horizontal to and transverse of said predetermined direction, and said means for providing a non-oxidizing atmosphere comprising a non-oxidizing gas supply coupled to the interior of said hollow porous roller and adapted to pass the gas through said porous roller to the lower face of said sheet.

References Cited by the Examiner

UNITED STATES PATENTS

| 2,395,727 | 2/1946 | Devol | 65—182 |
| 2,505,103 | 4/1950 | Devol | 65—25 |

FOREIGN PATENTS 769,692   3/1957   Great Britain.

DONALL H. SYLVESTER, *Primary Examiner.*

G. R. MYERS, *Assistant Examiner.*